Figure 1:
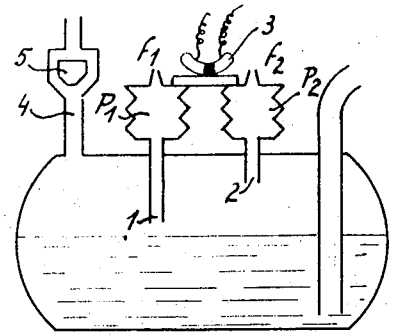

United States Patent
Ralet et al.

[15] 3,664,365
[45] May 23, 1972

[54] METHOD OF AN APPARATUS FOR THE AUTOMATIC SUPERVISION OF LIQUID LIMITS IN CLOSED TANKS

[72] Inventors: Claude Marie Ernest Ralet; Daniel Albert Clement Ralet, both of 661 Boulevard Poincare, Brussels, Belgium

[22] Filed: June 25, 1970

[21] Appl. No.: 49,719

[30] Foreign Application Priority Data

June 26, 1969 Belgium..................................735,169

[52] U.S. Cl..................................137/206, 137/386, 73/298
[51] Int. Cl..........................................................G01f 23/14
[58] Field of Search..................137/403, 393, 154, 206, 386; 73/298

[56] References Cited

UNITED STATES PATENTS 1,020,642   3/1912   Elkofer..................................137/393
3,200,971   8/1965   Trethewey..........................137/403 X
3,363,641   1/1968   Mylander..............................137/393

Primary Examiner—Alan Cohan
Attorney—John Lezdey

[57] ABSTRACT

A level detector for a tank for liquid comprises a dip tube having an open lower end within the tank. At its upper end the tube carries a pressure detector and a restricted orifice communicates the tube with an environment external to the tank. A higher gas pressure is produced in the tank than in said environment e.g. by the introduction of liquid into the tank and the pressure within the dip tube remains substantially the same as that in the tank until the lower end of the dip tube is immersed, causing a drop in pressure within the dip tube. This drop in pressure is used to control the introduction or removal of liquid from the tank to limit the level to a desired value. In a variant two dip tubes are used for each level each having its own restricted orifice communicating with said environment and one having its lower end slightly below the other, and the pressure detection means is responsive to the differential pressure between the dip tubes.

15 Claims, 4 Drawing Figures

3,664,365
PATENTED MAY 23 1972

CLAUDE MARIE ERNEST RALET, DANIEL ALBERT CLEMENT RALET INVENTOR

BY

*John Lesder* ATTORNEY

METHOD OF AN APPARATUS FOR THE AUTOMATIC SUPERVISION OF LIQUID LIMITS IN CLOSED TANKS

This invention relates to closed pressurized or unpressurized tanks in which automatic level control based on control of the supply and removal of liquid is required, for example where it is desired to provide top-level stopping and bottom-level starting of a pump supplying a water supply air tank — i.e. a pressurized tank associated with an air compressor, or where, in pressurized vented tanks, such as fuel oil tanks, it is necessary to prevent accidental spillage during refuelling by ensuring that the filling facility stops automatically when the desired upper liquid level is reached.

It is an object of the invention to provide a method and apparatus for the automatic supervision of limits of liquid level in closed tanks.

The invention provides detection of the critical levels by means of a critical pressure acting an extensible member as a result of the abrupt substitution of a dynamic condition for a static equilibrium.

Several ways are known of using a critical pressure in association with an extensible member to supervise critical levels. For instance, it is known for diaphragm-fitted domes to be placed at the bottom of a tank, the domes distorting more in proportion as the liquid level rises. Also known are air bubbling facilities in which a diaphragm reflects the pressure required for bubbles to pass. French Pat. No. 1,548,929 discloses a diaphragm detector which is disposed at the top of a dip tube and which operates, once the liquid has reached the dip tube end, in accordance with the compression of the air trapped in the dip tube.

The invention, however, is based on novel features enabling a clear and instantaneous pressure signal to be produced by a small variation in liquid level, the clearness of the pressure signal being the result of the abrupt changeover from a moving-gas condition to a static equilibrium position.

These features will be studied hereinafter in greater detail and an analysis will be given of how the physical principles are used. The pressure-sensitive members are connected to air or gas circuits supplied through dip tubes which extend through the tank top wall down to the levels to be supervised. These circuits have a small orifice to provide a leak which discharges to a lower-pressure environment. When the end of a dip tube is above the liquid, there is a small leakage rate of flow to the lower-pressure environment. Since the cross-section of the leak orifice is small, the resulting pressure loss is equivalent to the difference between the pressure, with the result that the higher gas pressure — i.e. the gas pressure above the liquid — is also the gas pressure in the corresponding detector chamber.

Considering now the brief critical time when the rising liquid almost touches the dip tube end, the constriction of the passage between the surface of the liquid and the tube end starts to reduce the gas flow; since the interior of the tube and thus the leak orifice ceases to be supplied freely, the pressure in the sensitive member starts to drop. This time is short, for the liquid, once it has touched the bottom of the tube, rises therein to a level corresponding to the pressure difference, the leak providing communication with the low-pressure environment. The detector must be connected at a height placing it out of reach of the liquid column. Thus there is an abrupt change from the condition in which the gas is moving freely up the tube to the condition in which static equilibrium exists with a column of liquid in the tube, the extensible member simultaneously changing over abruptly from the high pressure condition to the lower pressure condition.

As an advantageous way of appreciably improving the operation of the invention, a pressure regulator is placed in a line connecting the tank to the lower-pressure environment for example in the vent pipe in the very common case of storage tanks such as fuel oil tanks, for as previously explained, the pressure-sensitive member must be placed high enough not to be reached by a liquid column equal to the pressure difference between the air cushion in the tank and the low-pressure environment and thus the pressure in the tank must not be allowed to reach too high a value. The maximum value of this pressure difference must therefore be limited. Also, if the pressure detectors are to operate satisfactorily and to be satisfactorily sensitive, the pressure difference must remain within appropriate limits. It is therefore desirable to provide regulation of the pressure difference. The regulator can be embodied quite simply in the form of a calibrated valve comprising a weight capsule which is lifted a varying distance from its seat by the air flow. An increased rate of air flow lifts the capsule higher and vice-versa, capsule weight forming the pressure difference "set-value."

The continuous air or gas consumption which is either necessary to supply the leaks according to the invention or desirable for the purposes of regulation as just described is not necessarily a disadvantage, for in the frequent cases in which tanks are connected to atmosphere by a vent pipe, an air source which can be used for an anti-spill system according to the invention is available quite naturally during filling since the entering liquid expels an equivalent volume of air, and the positive pressure of the air cushion is equal to the pressure loss of the air passing through the vent pipe. In tanks of this kind, the small leaks associated with the dip tubes go to atmosphere.

The invention operates very satisfactorily with an air cushion positive pressure of the order of 60 mm water column. Conveniently, the vent is generously dimensioned and receives a valve calibrated by a weight corresponding to this required pressure.

In the method according to the invention, at least one pressure-sensitive member is associated with at least one dip tube extending into the tank and having its lower end within the tank open, said dip tube enabling a small level variation in the tank to cause a dynamic gas flow state (in which gas flows freely up the dip tube) to be replaced by a static equilibrium condition (in which the lower end of the dip tube is closed by a liquid column) or vice-versa. A leak orifice is provided from the or each dip tube arranged to produce a pressure loss so that the tube top part may communicate with an environment at a lower pressure, and the sensitive member, which is disposed at a height above the lower end of the dip tube which is greater than the height of the liquid column which would be supported by the pressure difference between the interior of the tank and said environment, controls the energization of a level-determining facility.

Figure 2:
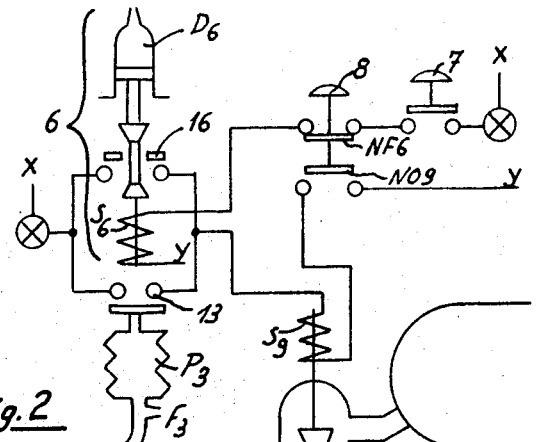
Figure 3:
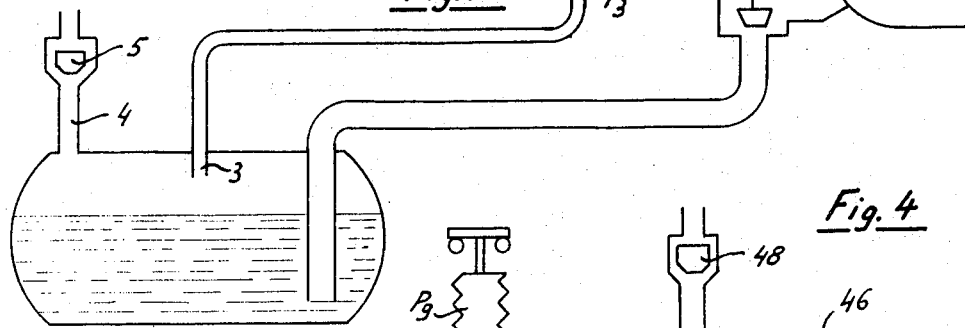
Figure 4:
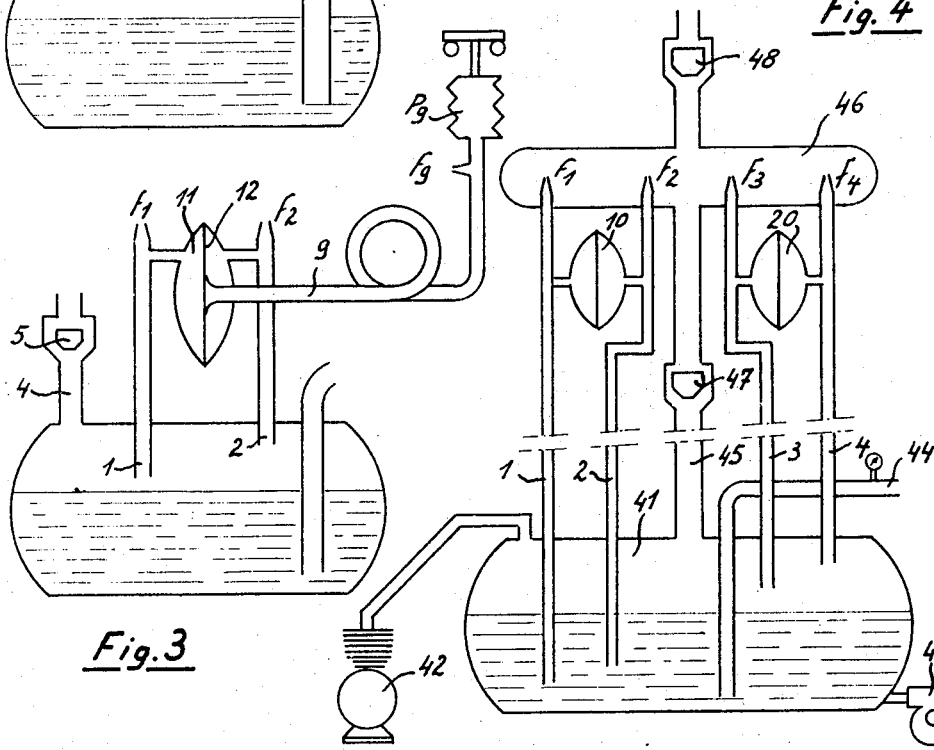

Various embodiments of the invention will now be described with reference to the accompany drawings, in which:

FIG. 1 is a schematic view of a first embodiment;
FIG. 2 is a schematic view of a second embodiment;
FIG. 3 is a schematic view of a third embodiment; and
FIG. 4 is a schematic view of a fourth embodiment.

Referring to FIG. 1 a closed tank has an air vent 4 with a pressure regulating valve 5 and a filling tube extending to adjacent the bottom of the tank interior, for the introduction of liquid. Extending through the top wall of the tank are dip tubes 1 and 2 having open lower ends at slightly different levels within the tank. Pressure detection means comprise expansible bellows members $P_1$ and $P_2$ mounted on top of the tubes 1 and 2 and providing compartments communicating with the interior of the respective dip tubes. Leak orifices $F_1$ and $F_2$ are provided in the bellows members $P_1$ and $P_2$ respectively communicating the interior of dip tubes 1 and 2 respectively with atmosphere.

A tilting mercury switch having a bulb 3 is carried on a beam extending across the tops of the bellows members.

In operation, with the tank substantially empty, the operator presses a "start" button and filling begins. The two bellows inflate at the same rate, the beam and the bulb 3 remaining horizontal and the mercury bead providing a current path for the control circuit. When the liquid reaches the level of the bottom of tube 1, bellows $P_1$ discharges through leak orifice $F_1$, the bulb 3 tilts and contact is interrupted, so that filling stops automatically. The use of a differential detector has the advantage that the initial phase of filling can then proceed without the need for any further facilities, for if a single set of bellows, like the bellows $P_3$ of FIG. 2, is used, contact cannot be made until the air pressure within the tank has built up, and so unless some special facility is provided the installation cannot be started. Such facility takes the form of a delay facility having a temporary contact which shunts the contact of the missing detector for the few seconds required to produce air cushion pressure.

FIG. 2 shows how the delay facility can be embodied electrically, in an arrangement in which expanded one dip tube 3 and one bellows $P_3$ is used, the bellows $P_3$ in its expanded position closing a switch 13 to provide a current path to the control circuit. In the arrangement of FIG. 2 there is the advantage that there is a positive safety feature in that any electrical fault stops filling. To make up for the initial opening of the contact 13, before the bellows $P_3$ has expanded, a switch 16 of a delayed-break dashpot relay 6 is placed in parallel with switch 13. Prior to filling the facility has been set or cocked by a button switch 7 which energizes the system and causes switch 16 to close as a result of winding S6 of the relay being energized by the current flowing after the closure of switch 7. Starting proper is initiated by operation of a button 8 which acts simultaneously on a normally closed switch NF6 and on a normally open switch NO9, the opening of the normally closed switch NF6 de-energizing winding S6 by interrupting the current flowing therethrough, the armature rising slowly with retardation by dashpot D6. The normally open switch NO9 causes opening of an electromagnetically operable valve S9 which controls filling of the tank. At the end of the dashpot delay, switch 16 is again opened, by which time air pressure has built up in the tank and thereafter the valve S9 is under the control of the detector $P_3$, which stays inflated only until the liquid level reaches the bottom of dip tube 3. Thereafter bellows $P_3$ deflates through the leak orifice $F_3$ and the switch 13 is opened, causing the valve S9 to close.

Electronic or pneumatic control systems can be used advantageously in the present context, in place of the electromechanical system shown.

Nor will the scope of the invention be exceeded if a brief manual operation is used to make up for the initial open condition of the switch 13 due to the lack of a positive pressure in the tank when filling begins. The invention can therefore be applied to a pouring pistol having a trigger-retaining device which is rigidly secured to the extensible member (e.g. a bellows such as $P_3$). This device would be arranged to operate immediately the air cushion has formed and to become inoperative upon de-flation of the bellows immediately the liquid reaches the stop level, so that the pistol closes automatically.

The practical advantage of the single-chamber detector of FIG. 2, with or without a delay facility, is that the detector and associated devices can be installed on a tanker vehicle and the driver has to connect up only a single detection hose (to the tube 3) before discharging fuel into the tank.

The embodiment shown in FIG. 3 combines the advantage of obviating the delay feature with the advantage of there being only a single hose to connect between the tanker and the tank to be filled therefrom. The pressure detector in FIG. 3 is embodied by a container comprising two domes or chambers 11, 12 separated by a prestretched rubber diaphragm. Dome 11 is connected with a dip tube 1, extending to the stop level, and with a leak orifice $F_1$, whereas dome 12 is connected to a dip tube 2, extending into the tank but stopping higher than hose 1, and with a leak orifice $F_2$. When the two pressures are in the chambers 11 and 12 are equal, the diaphragm, as a result of its stretched state, closes a valve seat at the end of a conduit 9 which extends into the chamber 12. When the liquid reaches the bottom of the tube 1, the pressure in dome 11 is thereby reduced, and the pressure differential between the domes 11 and 12 moves the diaphragm away from the end of conduit 9. Communication between the interior of the tank and the conduit 9 therefore occurs in the dome 12. Conduit 9 which may be a hose for most of its length, is connected to a second bellows type pressure detector P9 which acts on a normally closed electrical or pneumatic switch, for in this embodiment the reaching of the stop level corresponds to inflation of bellows P9, whereas in the embodiment of FIG. 2 the bellows $P_3$ deflated when the liquid reached the stop level.

Referring to FIG. 4, consideration will now be given to how the invention can be used in a pressure tank 41 continuously supplied with air by a compressor 42. The tank is required to be supplied with water intermittently by a pump 43 which starts when the water falls to a lower level and stops when the water rises to an upper level. Also, the water distribution from the tank 41 through line 44 is required to be at a very constant pressure. It will be assumed that tank 41 has been installed in a cellar and communicates via a riser 45 with a buffer reservoir 46 in an attic. Air can escape from reservoir 46 via a calibrated valve 48 serving as pressure regulator. The weight of valve 48 is adjusted so that the air pressure in attic reservoir 46 is e.g. 5 kg/cm². A calibrated valve 47 in riser 45 serves as air pressure difference regulator. It will be assumed that the air pressure difference between the upper and lower tanks 46 and 47 is e.g. 0.5 kg/cm², so that the air in the tank 41 is at a pressure of 5.5 kg/cm². In addition to the riser 45, two pairs of tubes 1-4 of much narrower cross-section than the riser 45 interconnect the two tanks 41 and 46. Four restricted throttle orifices $F_1$, $F_2$, $F_3$, $F_4$ serving to produce the leaks required for the purposes of this invention are disposed at the places where the four narrow tubes 1-4 enter the attic tank 46, and a differential pressure sensing device such as that enclosed in the domes 11 and 12 in FIG. 3 is connected between the tubes 1 and 2, and another between the tubes 3 and 4, said devices being referenced 10 and 20 respectively.

If the water reaches none of the dip tubes, the leakage rate of flow is such that the pressure loss is 0.5 kg/cm² and the device 10 operates to start the pump 43. If the water reaches the bottom of any dip tube, it rises 5 meters therein and the leak therethrough ceases. The pressure difference detectors 10, 20 are connected to the system at a height of at least 5 meters above the cellar. One pair of dip tubes per level is provided, and the immersed lengths of each pair are similar. Thus, tubes 1 and 2 are for the lower level and tubes 3 and 4 are for the upper level. The tubes of each pair have their lower ends at slightly different levels.

The detector produces a brief signal for the time taken by the water level to travel the difference between the lengths of the tubes of any single pair. In the case of the pair supervising the bottom level, this signal acts on the pump contactor start button, and the signal output by the top level pair acts on the stop button.

The invention is therefore of use in a wide variety of circumstances. Other possible examples are controlling the bottom level of a tank from which liquid is being discharges by compressed air. Operation is the same as at the bottom level of the cellar tank just described i.e. the liquid column is in static equilibrium in the detecting tubes until the tube bottom emerges from the liquid, thus indicating that the tube has emptied so that there is an air flow in the leak.

We claim:

1. Apparatus comprising a closed tank, means for providing a higher gas pressure within said tank than in an environment outside the tank, a dip tube extending into said tank and having an open lower end within said tank, a restricted orifice communicating said dip tube with said environment, means for controlling the passage of liquid into or out of said tank, pressure detecting means for detecting the gas pressure within said dip tube, said pressure detecting means controlling said liquid passage controlling means in accordance with the gas pressure within said dip tube.

2. The apparatus of claim 1 comprising a further dip tube extending into said tank and having an open lower end within said tank at a level slightly different from said open lower end of the first mentioned said dip tube a restricted orifice connecting said further dip tube with said environment, said pressure detecting means being operable in accordance with the pressure difference between said dip tubes.

3. The apparatus of claim 1 wherein said means for providing said higher pressure within said tank includes a restricted vent from said tank to said environment.

4. The apparatus of claim 3 wherein a pressure regulating valve is disposed in said vent.

5. The apparatus of claim 3 wherein said pressure detecting means is arranged to allow passage of liquid into said tank by said liquid passage controlling means if the pressure within said dip tube is above the pressure of said environment and wherein means is provided to countermand said pressure detecting means at the start of the introduction of liquid into said tank, until said higher pressure has been reached.

6. The apparatus of claim 2 wherein said pressure detecting means comprises a chamber divided into two compartments by a resilient diaphragm, each said chamber being connected to a different one of said tubes, a conduit extending into one of said chambers and terminating in a seal arranged to be closed by said diaphragm in the position of the latter adopted when the pressure in each of said chambers is equal, a further restricted orifice connecting said conduit with said environment and a pressure detecting device communicating with said conduit, for producing a signal upon a change in the gas pressure in said conduit.

7. The apparatus of claim 2 wherein said means for producing said higher pressure in the tank comprises an air compressor discharging into said tank, and wherein said environment is provided by a further tank at a higher level than the first mentioned tank, one such pair of dip tubes being provided to define an upper level limit and a lower level limit, a conduit connecting said tanks, and throttling means in said conduit, each said pair of dip tubes having a separate pressure detection means for detecting a pressure difference between the tubes of the pair.

8. In an apparatus for the automatic supervision of limits of liquid levels in closed tanks, in which a pressure variation acting on an extensible member is used to detect the liquid level, and in which at least one pressure-sensitive member is associated with means enabling a small level variation to cause a dynamic gas flow state to be replaced by a state of static pressure equilibrium or vice-versa, wherein said means comprises an air circuit having at least one tube whose bottom part extends through the tank top wall and dips down as far as the supervised liquid level, the upper part of said tube top part communicating via a restriction with an environment at a lower pressure than the interior of the tank, and said pressure sensitive member being connected to said tube at a level above the level of the liquid column in said tube measuring the pressure difference between the interior of the tank and said environment and controlling the energization of a level-determining facility.

9. The apparatus according to claim 8 which includes a pressure difference regulator disposed in a line connecting the tank to the lower-pressure environment.

10. The apparatus according to claim 9 wherein the pressure difference regulator is a calibrated valve whose weight is adjusted to the required pressure difference.

11. The apparatus according to claim 8 wherein said dip tube communicates with the atmosphere and the rate of air flow and the air pressure supplying said circuit depending on the compression of the air in said tank by make-up liquid and upon the resistance of a vent to the removal of such air from said tank.

12. The apparatus according to claim 9, wherein said pressure difference regulator has one side connected to a leakage circuit comprising a dip tube communicating with the supervised liquid level and the other side connected to a leakage circuit having a dip tube communicating with a level higher than the supervised level, whereby the difference between the pressure causes filling to cause when the end of the longer tube becomes immersed.

13. The apparatus according to claim 8, in which a single leakage circuit is associated with a single extensible nondifferential member and which includes delay means to compensate for the absence of filling authorization signal resulting from the lack of air pressure at the beginning of filling.

14. The apparatus according to claim 9, in which said pressure difference regulator has two compartments separated by a prestressed resilient diaphragm whereby in the event of a pressure difference the entry of a tube connecting the air circuit communicating with the top intake to a third small-leak circuit is opened, said third small-leak circuit comprising an extensible member which upon pressurization produces a top-level signal.

15. A system comprising the apparatus of claim 8 in association with a water supply air tank supplied continuously by an air compressor wherein the higher-pressure environment takes the form of a tank at a higher level than the water supply air tank and in which the leakages from two pairs of detection dip pipes of similar but unequal lengths enter the higher-level tank, one pair of dip pipes indicating the top level and the other pair indicating the bottom level, and the pipes of these pairs communicating with pressure difference regulators.

* * * * *